(12) United States Patent
De Vreede et al.

(10) Patent No.: US 10,231,572 B2
(45) Date of Patent: Mar. 19, 2019

(54) CONSUMABLE RECOGNITION SYSTEM, SET OF CONSUMABLES AND BEVERAGE DISPENSER

(71) Applicant: KONINKLIJKE PHILIPS N.V., Eindhoven (NL)

(72) Inventors: Jasper De Vreede, Eindhoven (NL); Karel Johannes Adrianus Van Den Aker, Eindhoven (NL); Franciscus Johannes Gerardus Hakkens, Eindhoven (NL); Egbertus Reinier Jacobs, Eindhoven (NL); Mart Kornelis-Jan Te Velde, Eindhoven (NL); Christoph Dobrusskin, Eindhoven (NL); Gerben Kooijman, Eindhoven (NL); Klaas Jacob Lulofs, Eindhoven (NL); Frederik Jan De Bruijn, Eindhoven (NL); Johannes Wilhelmus Weekamp, Eindhoven (NL); Susanne Maaike Valster, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 140 days.

(21) Appl. No.: 15/101,960

(22) PCT Filed: Dec. 5, 2014

(86) PCT No.: PCT/EP2014/076681
§ 371 (c)(1),
(2) Date: Jun. 6, 2016

(87) PCT Pub. No.: WO2015/091017
PCT Pub. Date: Jun. 25, 2015

(65) Prior Publication Data
US 2016/0302612 A1    Oct. 20, 2016

(30) Foreign Application Priority Data

Dec. 20, 2013 (EP) .................................... 13199227

(51) Int. Cl.
*A47J 31/44* (2006.01)
*A47J 31/36* (2006.01)
*A47J 31/40* (2006.01)
*B65D 85/804* (2006.01)
*A47J 31/00* (2006.01)

(52) U.S. Cl.
CPC ....... *A47J 31/4492* (2013.01); *A47J 31/3623* (2013.01); *A47J 31/3676* (2013.01);
(Continued)

(58) Field of Classification Search
CPC ... A47J 31/4492; A47J 31/3676; A47J 31/002
(Continued)

(56) References Cited

U.S. PATENT DOCUMENTS 8,033,211 B2   10/2011   Halliday
8,459,179 B2    6/2013   Ozanne
(Continued)

FOREIGN PATENT DOCUMENTS

CA    2766194      * 12/2011
EP    2570059 A1    3/2013
(Continued)

*Primary Examiner* — Reginald Alexander

(57) ABSTRACT

The present invention relates to a consumable recognition system for recognizing placement and/or type of consumable containing a food substance for the preparation of a beverage by use of a beverage dispenser. To enable the recognition of placement and/or type of consumable in a simple, foolproof and easily implementable way the system comprises a plurality of magnetic and/or electric field elements (31, 32, 33, 301) for separately sensing a magnetic and/or electric field, wherein said consumable comprises one or more magnetically and/or electrically conductive elements (42, 51, 61, 71, 81, 82, 91, 92) and the sensed magnetic fields depend on at least one characteristic of the
(Continued)

one or more magnetically and/or electrically conductive elements, a driver (34) for providing drive currents to said magnetic and/or electric field elements, and a signal processor (35) for recognizing placement and/or type of consumable based on the sensed magnetic and/or electric fields.

13 Claims, 11 Drawing Sheets

(52) U.S. Cl.
CPC ............. *A47J 31/407* (2013.01); *A47J 31/44* (2013.01); *A47J 31/4403* (2013.01); *B65D 85/8043* (2013.01); *A47J 31/002* (2013.01)

(58) Field of Classification Search
USPC .................................. 99/295, 280, 282, 283
See application file for complete search history.

(56) References Cited

U.S. PATENT DOCUMENTS

| | | | |
|---|---|---|---|
| 8,857,317 B2 * | 10/2014 | Manser ................... | A23L 1/296 99/289 R |
| 9,351,604 B2 | 5/2016 | Talon | |
| 10,045,656 B2 | 8/2018 | Carr | |
| 2002/0048621 A1 * | 4/2002 | Boyd ................... | A47J 31/3623 426/77 |
| 2006/0144244 A1 * | 7/2006 | Girard ................... | A47J 31/402 99/295 |
| 2011/0052761 A1 | 3/2011 | Yoakim | |
| 2013/0014648 A1 | 1/2013 | Rognon | |
| 2013/0064929 A1 * | 3/2013 | Jarisch ..................... | A47J 31/22 426/87 |
| 2017/0305654 A1 * | 10/2017 | Kruger ............... | B65D 85/8043 |

FOREIGN PATENT DOCUMENTS

| | | |
|---|---|---|
| WO | 2005053485 A1 | 6/2005 |
| WO | 2011000723 A2 | 1/2011 |
| WO | 2011000724 A1 | 1/2011 |
| WO | 2011054889 A1 | 5/2011 |
| WO | 2011069830 A1 | 6/2011 |
| WO | 2012000878 A2 | 1/2012 |
| WO | 2012004133 A1 | 1/2012 |
| WO | 2012123440 A1 | 9/2012 |
| WO | 2013046149 A1 | 4/2013 |
| WO | 2013153526 A1 | 10/2013 |

\* cited by examiner

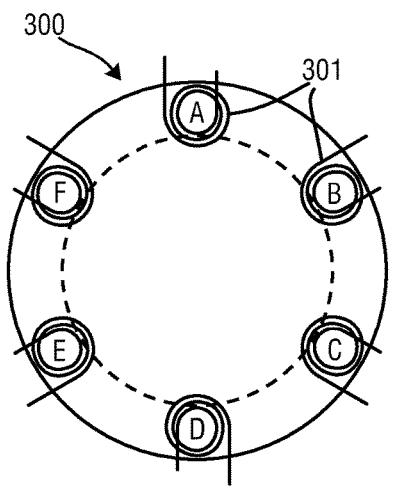
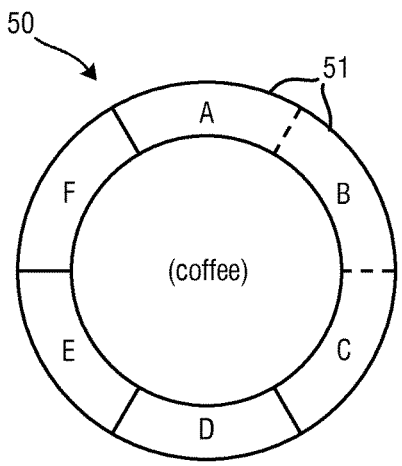
FIG.3A  FIG.3B
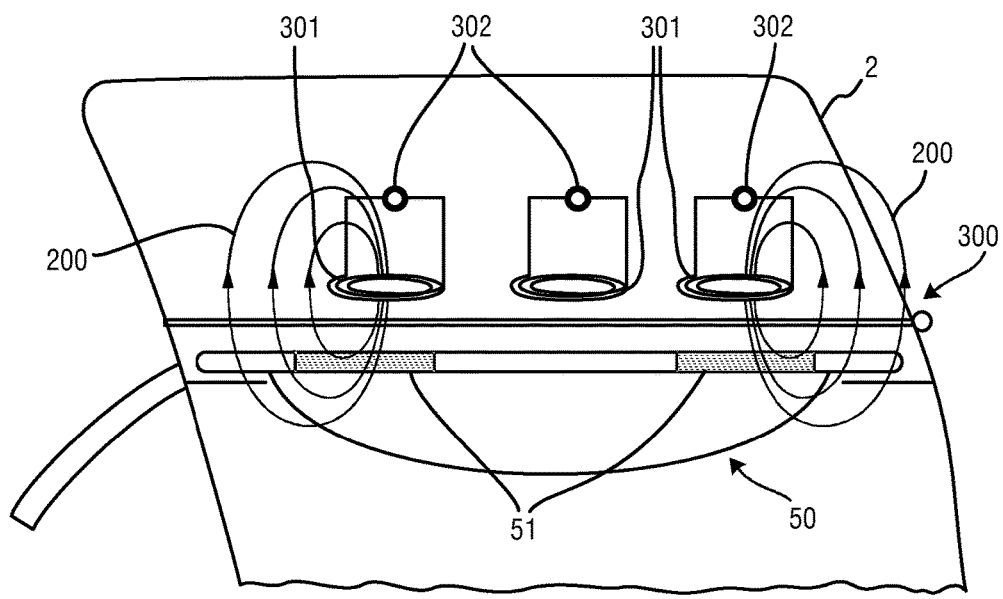
FIG.3C tion of a beverage comprising a first and second covering
CONSUMABLE RECOGNITION SYSTEM, SET OF CONSUMABLES AND BEVERAGE DISPENSER This application is the U.S. National Phase application under 35 U.S.C. § 371 of International Application No. PCT/EP2014/076681, filed on Dec. 5, 2014, which claims the benefit of International Application No. 13199227.3 filed on Dec. 20, 2013. These applications are hereby incorporated by reference herein.

FIELD OF THE INVENTION

The present invention relates to a consumable recognition system for recognizing placement and/or type of consumable containing a food substance for the preparation of a beverage by use of a beverage dispenser. The present invention relates further to a set of consumables comprising at least two consumables for use in a beverage dispenser for preparation of a beverage, to a beverage dispenser for preparation of a beverage, and to a beverage preparation system for preparation of a beverage.

BACKGROUND OF THE INVENTION

The invention relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food. Such a beverage making device is e.g. disclosed in WO 2005/053485 A1. Said beverage making device comprises a brewing chamber (hereinafter also called "chamber") for enclosing one or more pads containing a substance from which the beverage is to be brewed, means for supplying water to said brewing chamber, and means for conducting the brewed beverage from the brewing chamber.

More and more types and flavors of these beverages are introduced which creates a new opportunity for innovation. When the type of beverage or ingredient is recognized the appliance can automatically optimize the brewing parameters including one or more of time, temperature, pressure, flow and cup volume to the consumable offered to the appliance. Such a system for the production of beverages is e.g. disclosed in WO 2013/046149 A1, which system comprises a beverage dispenser and a pod to be inserted in the beverage dispenser for the passage of the extraction liquid of the beverage. The pod includes a filtering body (also referred to as substance containing body) which defines a space that contains the food substance from which the beverage is obtained. The filtering body has on the outside a flange. There is a recognition element associated to the filtering body which can be recognized and/or interpreted by a recognition device of the beverage dispenser.

The consumables (also called single-serve units) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape, is generally called a "pod" (or "pad") and consists of two sections made of thin soft material, pierced, paired in order to define a cavity in which the food substance is placed. The material may be for example paper, or a cloth or a non-woven fabric with filtering properties. The two sections are generally circular and are coupled along their outer edges, defining an outer annular flange. The machines which use pods have two half-shells which are sealed to define a chamber where the pod is placed. Specifically, the annular flange of the pod is squeezed, for sealing, between the opposite surfaces of the half-shells, defined outside the chamber.

For most appliances, the brewing parameters are fixed and therefore the same for each beverage. Other appliances can have manual settings, but these have to be adjusted by the user for each type of beverage. When a consumable (in particular its type, i.e. which type of food substance is held within the consumable, e.g. whether it is coffee, decaffeinated coffee, coffee distinguished by grind fineness, roast, blend, flavor, etc.) is recognized automatically by the appliance, the settings can be adjusted automatically. This increases the user convenience. Furthermore, the brewing process is correctly adjusted for each consumable type so that the optimal beverage is created.

WO 2013/153526 A1 discloses a capsule adapter for use in a beverage producing machine. The capsule adapter comprises a capsule receptacle for housing a capsule and having an apertured bottom wall; a first piercer arranged in the capsule receptacle; a cover for closing the capsule receptacle, the cover having at least one water-inlet port; a second piercer arranged on the cover. The capsule adapter is configured for being introduced in a brewing chamber of a beverage producing machine, with a capsule housed therein.

WO 2011/000723A2 discloses a capsule for the preparation of a beverage comprising a first and second covering walls connected at a peripheral seam for forming a cavity containing a beverage ingredient; a contactless element for identifying the capsule by detecting means of a beverage producing device; wherein the identifying element is oriented along its longer dimension substantially orthogonally relative to the transversal plane passing along the seam of the capsule.

Further beverage dispensers and consumables are disclosed in EP 2 570 059 A1, WO 2012/123440 A1, WO 2011/069830 A1, WO 2011/054889 A1 and US 2011/0052761 A1.

SUMMARY OF THE INVENTION

It is an object of the present invention to provide a consumable recognition system for recognizing placement and/or type of consumable in a simple, foolproof and easily implementable way. It is a further object of the present invention to provide a corresponding set of consumables comprising at least two consumables for use in a beverage dispenser for preparation of a beverage, a corresponding beverage dispenser for preparation of a beverage, and a corresponding beverage preparation system for preparation of a beverage.

In a first aspect of the present invention a consumable recognition system is presented comprising:
  a plurality of magnetic and/or electric field elements for separately sensing a magnetic and/or electric field, wherein said consumable comprises one or more magnetically and/or electrically conductive elements and the sensed magnetic and/or electric fields depend on at least one characteristic of the one or more magnetically and/or electrically conductive elements, a driver for providing drive currents to said magnetic and/or electric field elements, and a signal processor for recognizing placement and/or type of consumable based on the sensed magnetic and/or electric fields.

In a further aspect of the present invention a set of consumables is presented, particularly for use with a consumable recognition system according to the first aspect, wherein each consumable of said set comprises:

a filtering body defining a space containing a food substance, from which the beverage is obtained, and two or more magnetically and/or electrically conductive elements for affecting the magnetic and/or electric field sensed by one or more magnetic and/or electric field elements of a consumable recognition system, wherein the two or more magnetically and/or electrically conductive elements have at least one characteristic, which is affecting the sensed magnetic and/or electric field and which is different for each type of consumable of the set of consumables, wherein said one or more magnetically and/or electrically conductive elements are arranged on or within a top, bottom and/or side wall of the consumable or on or within a cover of the consumable.

In still a further aspect of the present invention a beverage dispenser is presented comprising:

a consumable recognition system as disclosed herein for recognizing placement and/or type of consumable, a chamber for receiving the consumable and for the passage of extraction liquid through the consumable, a liquid processing unit for the passage of extraction liquid through the consumable, and a controller for controlling one or more parameters of the beverage dispenser according to the recognized placement and/or type of consumable.

In yet a further aspect of the present invention a beverage preparation system is presented comprising:

a beverage dispenser as disclosed herein, and a consumable from among a set of consumables as disclosed herein containing a food substance, from which the beverage is obtained by use of extraction liquid, said consumable being arranged in the chamber of the beverage dispenser.

Preferred embodiments of the invention are defined in the dependent claims. It shall be understood that the set of consumables, beverage dispenser and beverage preparation system have similar and/or identical preferred embodiments as the claimed consumable recognition system and as defined in the dependent claims.

The present invention is based on the idea to discern/recognize the consumable with the use of induction. By use of electromagnetic (i.e. induction) coils that a magnetic and/or electric field is created. The consumable comprises a magnetically and/or electrically conductive element, for instance a specific amount of conductive material, which is unique for each type of consumable. By bringing the consumable into the magnetic field, the self-inductance in induction coil(s), representing a preferred embodiment of the magnetic and/or electric field elements, changes due to the magnetically and/or electrically conductive material of the magnetically and/or electrically conductive element. The conductive material does not need to be magnetically conductive, but could also be electrically conductive, for instance copper or aluminum. Due to induced eddy currents in this material it will change the magnetic field of the induction coil.

According to the present invention details of the consumable recognition system, i.e. of the elements and the way how placement and/or type of consumable can be recognized, and of the set of consumables, in particular the elements used for enabling such a recognition with the proposed consumable recognition system are disclosed.

The magnetically and/or electrically conductive elements of the proposed set of consumables are arranged on or within a top, bottom and/or side wall of the consumable or on or within a cover of the consumable, but not inside the cavity of the consumable. This provides that the consumable can be manufactured more easily and that the identifying elements are not mixed with the food substance provided within the consumable.

The plurality of magnetic and/or electric field elements of the proposed consumable recognition system enable separately sensing a magnetic and/or electric field thus increasing accuracy and sensitivity of the recognition. Hence, separate identifiers (i.e. conductive elements) on separate portions of the consumable may be provided according to the present invention, which are separately sensed. The plurality of magnetic and/or electric field elements can thus be used to separately identify separate elements or they can be used together in combination and cooperation to provide an improved recognition result. Thus, the response profile of the magnetization sensed by the plurality of magnetic and/or electric field elements is not much or even not at all dependent on the position of the conductive elements of the consumable. Even during transport of the consumable and insertion into the beverage dispenser the position of the conductive elements is fixed and guaranteed, which ensures correct recognitions.

By varying a characteristic of the magnetically and/or electrically conductive element, e.g. the amount or type of the magnetically and/or electrically conductive material, a different readout can be generated on the magnetic and/or electric field element(s) for each type of consumable. Generally, in an embodiment the sensed magnetic and/or electric fields depend on one or more of the position, orientation, material, thickness, length, width, number of the two or more magnetically and/or electrically conductive elements.

In another embodiment the system comprises an array of induction coils and/or capacitive sensitive pads (e.g. in the form of plates or rings) arranged above, below and/or around the consumable. The particular arrangement depends inter alia on the design of the consumable and on the arrangement of the magnetically and/or electrically conductive element on or in the consumable. Generally, the distance between the magnetically and/or electrically conductive element and the magnetic and/or electric field element(s) shall be the same for each consumable.

In a practical embodiment said magnetic and/or electric field elements are arranged at or within a closing member of the beverage dispenser, in particular a lid of the beverage dispenser.

Preferably, the number of magnetic and/or electric field elements corresponds to the maximum number of magnetically and/or electrically conductive elements and each magnetic and/or electric field element is arranged to sense a magnetic and/or electric field from a sensing area, in which at most a single magnetically and/or electrically conductive element is arranged. Hence, the position of the magnetic and/or electric field element(s) is different for each type of consumable so that the positions of the magnetic and/or electric field elements at which a magnetic and/or electric field influenced by an magnetic and/or electric field element is measured indicates the type of consumable.

Advantageously, said signal processor is configured to generate a code from the sensed magnetic and/or electric fields and to recognize the type of consumable based on said code.

Still further, in an embodiment said plurality of magnetic and/or electric field elements comprises two or more conductive pathways, in particular concentric rings, of electrically conductive material for sensing an electrical field between said conductive pathways. In this embodiment several electrically conductive pathways (representing the conductive element) are provided inside or on the outside of the consumable. A consumable which comprises elements of conductive pathways is capacitively in contact with the recognition system such that it can measure the electrical resistance level of one or more conductive pathways. In this embodiment the level of resistance depends on the type of material used for the conductive pathways, including length, width and thickness. The readout of resistance mutually is indicative for a specific type of consumable.

According to the present invention the one or more magnetically and/or electrically conductive elements are either arranged on or within a top, bottom and/or side wall of the consumable or on or within a cover of the consumable. This is particularly useful if the magnetic and/or electric field elements are arranged in or at the lid of the beverage dispenser.

In another practical implementation a magnetically and/or electrically conductive element comprises a ring or ring segment of magnetically responsive material. This enables the capacitive sensing as provided in an embodiment of the consumable recognition system. Preferably, the rings or ring segments of the two or more magnetically and/or electrically conductive elements are arranged concentrically.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1A:
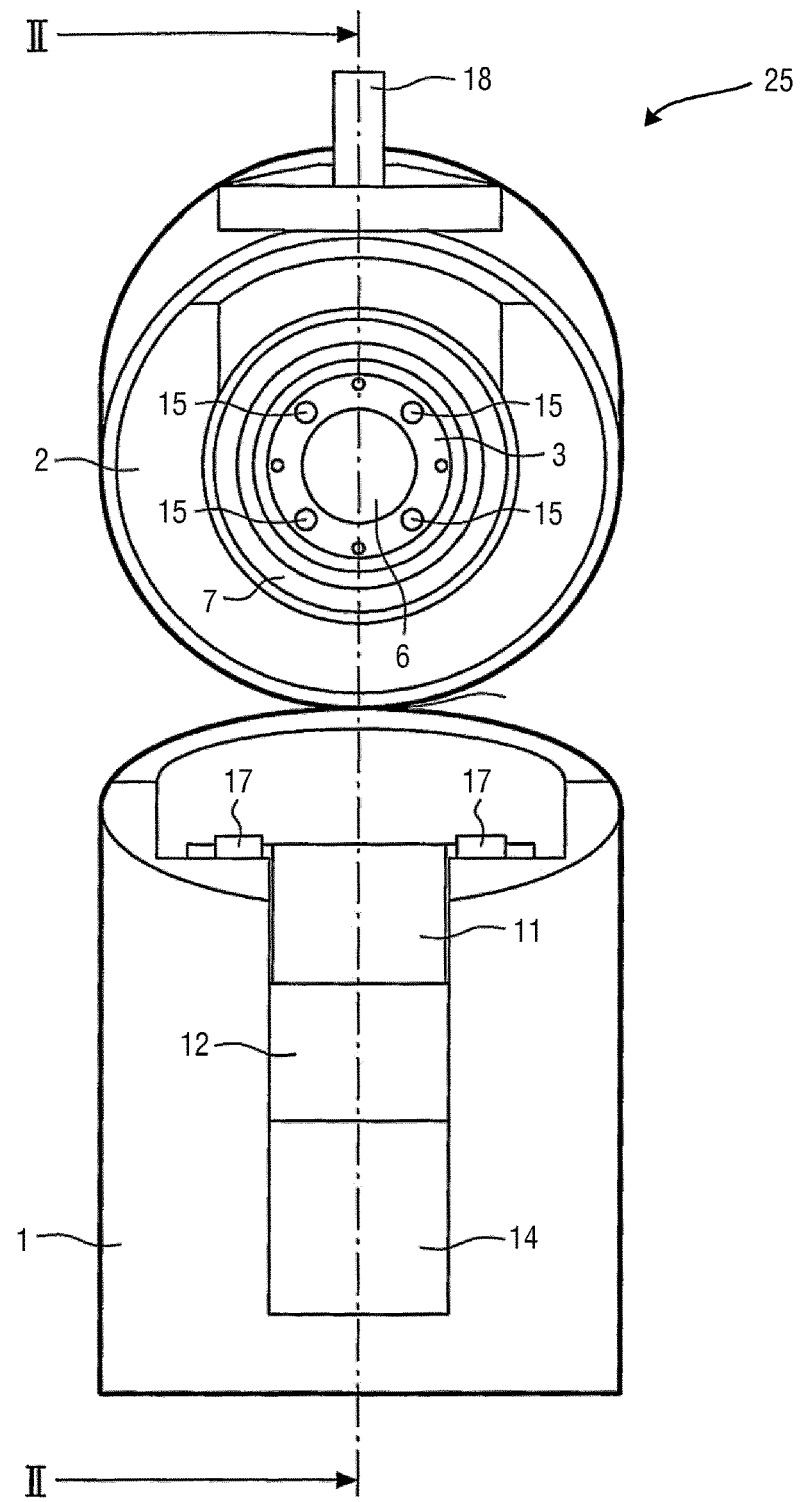
FIG. 1 shows different views of an embodiment of a beverage dispenser according to the present invention.

FIG. 1 shows different views of an embodiment of a beverage dispenser 25 in the form of a coffee making device that generally, together with the consumable 4, forms a beverage preparation system. The coffee making device (i.e. the beverage dispenser 25) includes a (schematically depicted) consumable recognition system 30 according to the present invention. The coffee making device uses soft pads as consumables, but it shall be noted here that the invention is neither limited to the use of pads nor limited to coffee making devices. In other embodiments the beverage dispenser is configured to be used for making other beverages than coffee, e.g. tea, hot or cold milk, soup, baby food, etc. Further, pods or capsules may be used as consumables, and the consumables generally contain a corresponding food substance for the preparation of the respective beverage by use of the beverage dispenser.

The coffee making device comprises a stationary part 1 and a hinging part 2. The stationary part 1 comprises the lower wall 8, 9 of the brewing chamber 19 and the hinging part 2 includes the upper wall 3 of the brewing chamber 19. The stationary part 1 furthermore comprises a water container and means for heating the water (or, more generally, an extraction liquid) and pumping a predetermined quantity of the heated water to the brewing chamber 19, which portions of the device are only schematically shown as liquid processing unit 20 for the passage of extraction liquid through the pad 4.

FIG. 1A is a front view of the uppermost portion of the coffee making device showing the stationary part 1 and the hinging part (or lid) 2 of the device. The lid 2 is represented in the open position, i.e. the position in which the brewing chamber 19 is accessible, for example for replacing the pad 4. The upper wall 3 of the brewing chamber is in a substantially vertical position in this case.

Figure 1B:
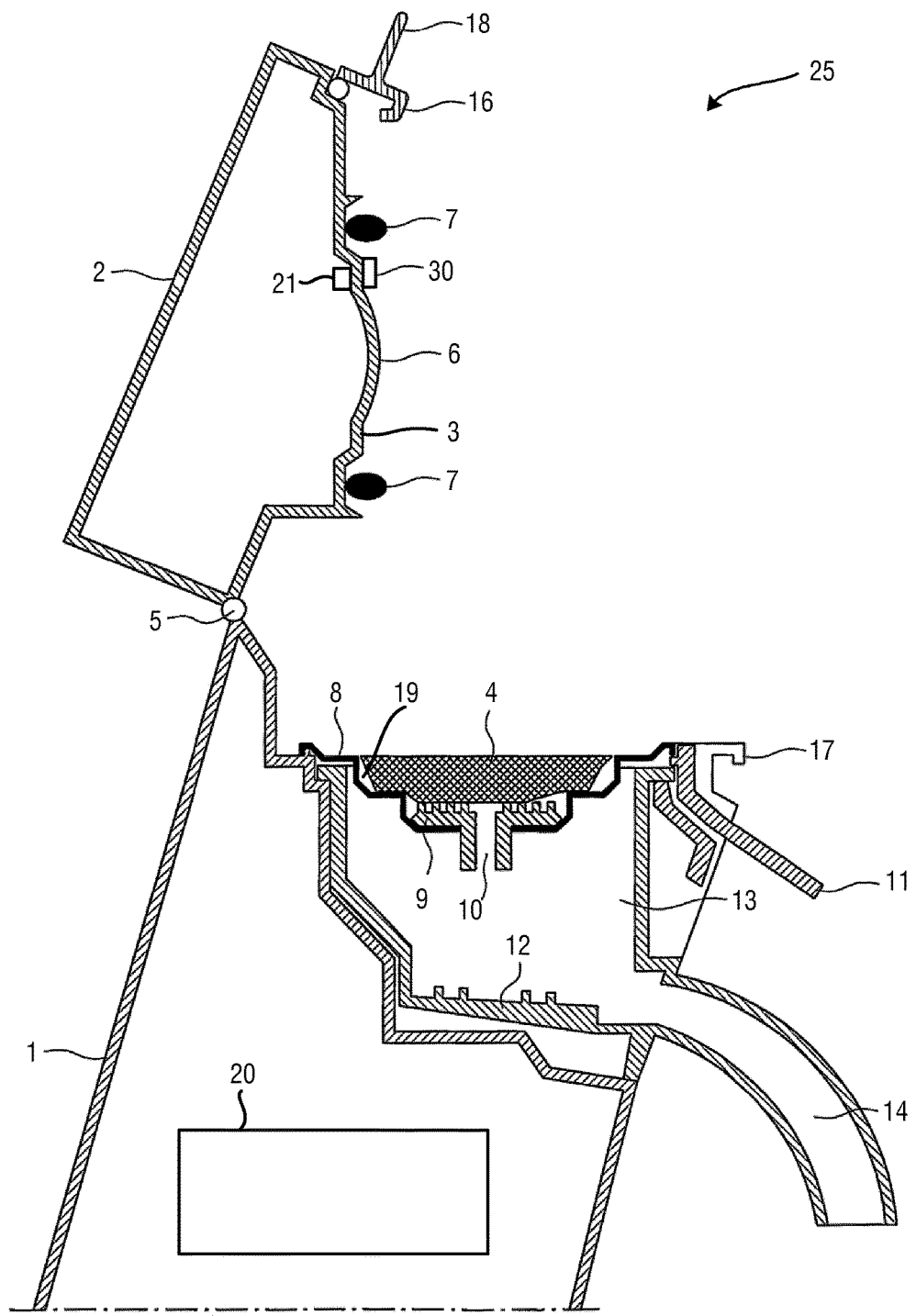
Figure 1C:
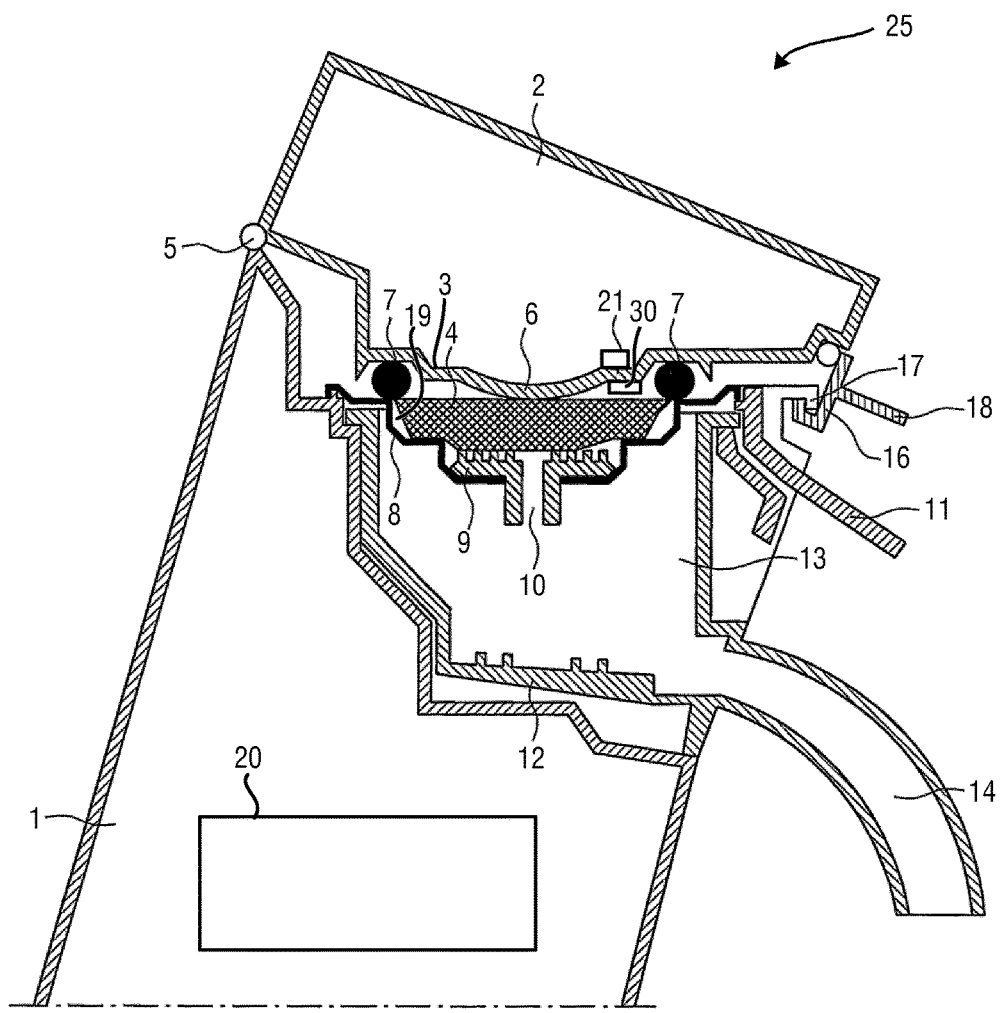

FIGS. 1B and 1C are cross-sectional views with the lid 2 shown in open position (FIG. 1B) and in closed position (FIG. 1C) respectively. The lid 2 hinges about an axis 5, so that it can make a rotating movement. The upper wall 3 of the brewing chamber is provided with a spherical protrusion 6 in its central part, i.e. a dome in the wall 3. A flexible sealing ring 7 is attached to the hinging lid 2 around the upper wall 3.

A first removable part, forming the lower wall of the brewing chamber, is composed of a metal part 8 with attached to it a plastic element 9 having a central outflow opening 10. At its upper side, the plastic element 9 is provided with a number of protrusions to support the pad 4 and to create space for conducting the brewed beverage between the protrusions. The first removable part 8, 9 is designed to contain one pad 4. It can be replaced by a different removable part being designed to contain two pads 4, in which case it encloses more space.

The first removable part 8, 9 is provided with a handle 11 to facilitate its removal from the stationary part 1 of the device. The first removable part 8, 9 can be removed for replacement or cleaning. Below said first removable part 8, 9 there is a second removable part 12, enclosing a beverage collection chamber 13 and provided with a beverage outflow tube 14 that extends outside the stationary part 1 of the device. The brewed beverage, collected in collection chamber 13, leaves the device through outflow tube 14 and can be caught in a cup or the like.

When the lid 2 is closed, sealing ring 7 abuts against the upper wall 3 as well as against said part 8 of the first removable part 8, 9, so that the brewing chamber 19 is closed, except for the holes 15 (or nozzles) in the upper wall 3 for supplying heated water to the brewing chamber, and except for the outflow opening 10. The brewing chamber 19 may enclose a pad 4 as shown in FIG. 1C. Heated water is supplied through holes 15 in the upper wall 3 and passes through the pad 4 to extract coffee. The brewed coffee leaves the brewing chamber through the outflow opening 10. Then the brewed coffee will be collected in the beverage collection chamber 13 and subsequently leave the device through outflow tube 14.

As is shown in FIG. 1C, the lid 2 is kept closed by a hinging latch 16 engaging a downwardly extending edge 17 of the stationary part 1 of the device. The latch 16 can only be released in that the lid 2 is moved in downward direction. The upper wall 3 of the brewing chamber is moved towards the lower part 8, 9 thereby, so that the dome 6 is pressed into the pad 4. This movement squeezes the pad 4, so that excess residue liquid will leave the pad 4 and will leave the brewing chamber through outflow opening 10.

The consumable recognition system 30 allows recognizing placement and/or type of consumable in a simple, foolproof and easily implementable way. Once the type of consumable (pod) 4 is recognized one or more parameters of the beverage dispenser 25 are controlled by a controller 20 according to the recognized type of consumable. For instance, just to give a simple example, if it is recognized that the consumable contains fine grinded coffee (which is preferably used for making espresso), the liquid is pressed with a higher pressure through the pod than in case the consumable contains regular grinded coffee (as preferably used for making coffee). Parameters that can generally be controlled may be one or more of the temperature of the water, the quantity of water to be used, the pressure and/or the speed of the water supply, the infusion time, flow and cup volume, etc. The consumable recognition system is further suitable to recognize placement of a consumable into the brewing chamber, i.e. it can be recognized if or if not a consumable has been inserted, based on which information the dispensing process may be started automatically (if a consumable has been inserted) or a signal may be issued indicating that a consumable needs to be inserted.

The general idea of using a consumable recognition system and a control of one or more parameters of the beverage dispenser based on the recognized type of the consumable can also be used in other types of beverage dispensers using e.g. capsules as consumables. Such beverage dispensers are widely known and used. An example of such a beverage dispenser is e.g. described in WO 2012/123440 A1, which also includes a sensing arrangement for detecting an event related to the insertion of a capsule and/or the presence of a capsule as well as the type of capsule in order to automate the preparation of the beverage.

Hence, even if the various embodiments of consumables and consumable recognition systems explained in the following refer to a particular type of consumable and, thus, a particular type of beverage dispenser, the respective embodiments shall generally not be understood to be limited only to this type of consumable and/or this type of beverage dispenser.

Figure 2:
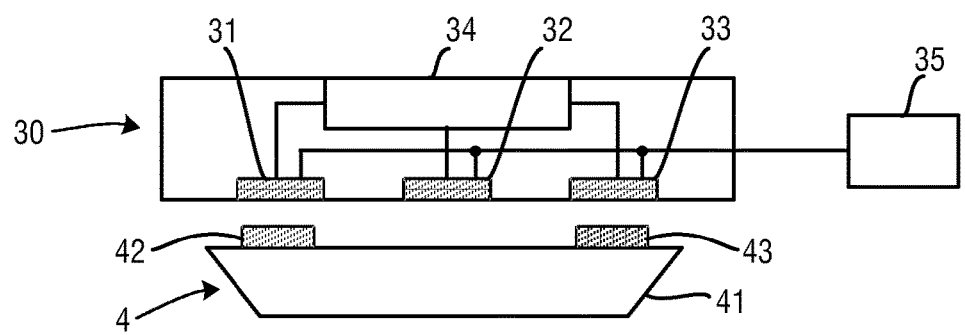
FIG. 2 shows a schematic diagram of two general layouts of a consumable recognition system and a corresponding consumable according to the present invention.

An embodiment of a consumable recognition system and a corresponding consumable according to the present invention is depicted in FIG. 2.

The consumable recognition system 30 generally comprises a plurality of magnetic and/or electric field elements 31, 32, 33 for separately sensing a magnetic and/or electric field, wherein said consumable 4 comprises one or more magnetically and/or electrically conductive elements 42, 43 and the sensed magnetic and/or electric fields depend on at least one characteristic of the one or more magnetically and/or electrically conductive elements. The system 30 further comprises a driver 34 for providing drive currents to said magnetic and/or electric field elements 31, 32, 33 and a signal processor 35 for recognizing placement and/or type of consumable 4 based on the sensed magnetic and/or electric fields.

The consumable 4 generally comprises a filtering body 41 defining a space containing a food substance, from which the beverage is obtained. Further, the consumable 4 comprises two or more magnetically and/or electrically conductive elements 42, 43 for affecting the magnetic and/or electric field sensed by the one or more magnetic and/or electric field elements 31, 32, 33 of the consumable recognition system 30, wherein the two or more magnetically and/or electrically conductive elements 42, 43 have at least one characteristic, which is affecting the sensed magnetic and/or electric field and which is different for each type of consumable of the set of consumables.

Next, several detailed embodiments of a consumable and corresponding detailed embodiments of the consumable recognition system according to the present invention will be explained. For the consumable it will be explained how the different types of consumables of a set of consumables containing those different types can be distinguished and how the consumable recognition system is accordingly constructed. For the respective consumable recognition systems the drive and the signal processor are generally not explicitly shown.

Figure 3D:
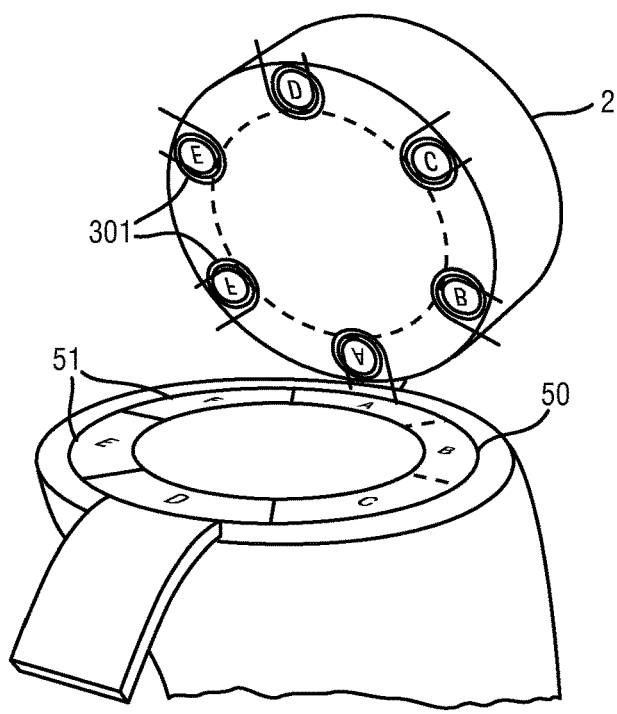
FIG. 3 shows different views of a first embodiment of a consumable recognition system according to the present invention and a corresponding consumable according to the present invention.

FIG. 3 shows different views of a first embodiment of a consumable recognition system 300 according to the present invention and a corresponding consumable 50 according to the present invention. In particular, FIG. 3A shows a top view of the lid 2 of the beverage dispenser comprising several induction coils 301. FIG. 3B shows a top view of the consumable 50. FIG. 3C shows a cross section and FIG. 3D shows a perspective view of the beverage dispenser including the consumable recognition system 300 and the consumable 50.

When an alternating electric current is sent through the induction coils 301 by the drive units 302, a magnetic field 200 is created around each induction coil 301. The consumable 50 comprises several conductive elements 51 representing the magnetically and/or electrically conductive elements, such as metal foils. These elements 51 are placed at specific locations (e.g. in this embodiment at locations A, B, C, E as shown in FIG. 3B) that correspond with the locations of some of the induction coils 301. For each of the potential locations of the elements (i.e. for all locations A-F) a corresponding induction coil 301 is provided. When the lid 2 of the beverage dispenser is closed, the magnetic field 200 around certain coils comes in range of the conductive elements. This creates a change in the inductance on the induction coils (here the coils 301 indicated by A, B, C, E in FIGS. 3A, 3D) that have a conductive element 51 close by. These induction coils 301 form a code that communicates the consumable type.

FIG. 4 shows different views of a second embodiment of a consumable recognition system 310 and of two embodiments of a corresponding consumable 60, 70 according to the present invention. In particular, FIG. 4A shows a top view of the lid 2 of the beverage dispenser comprising a single induction coil 311. FIG. 4B shows a top view of the first embodiment of the consumable 60. FIG. 4C shows a top view of the second embodiment of the consumable 70. FIG.

4D shows a perspective view of the beverage dispenser including the consumable recognition system 310 and the consumable 60.

Figure 4A:
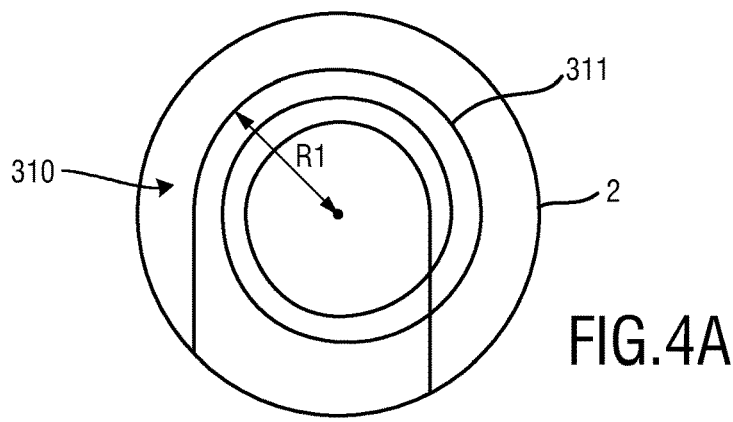
FIG. 4 shows different views of a second embodiment of a consumable recognition system and of two embodiments of a corresponding consumable according to the present invention.
Figure 4B:
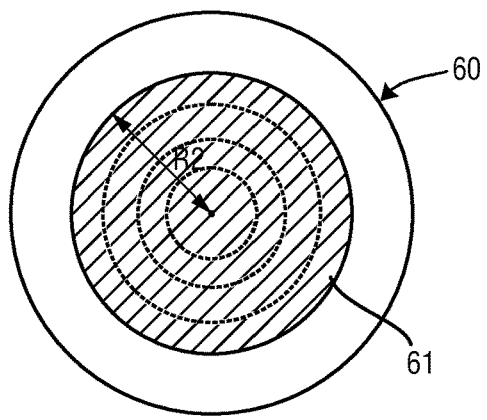
Figure 4C:
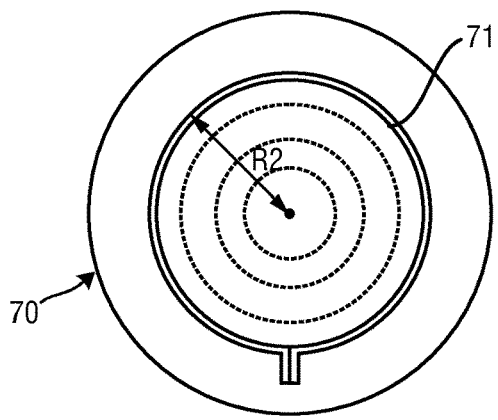
Figure 4D:
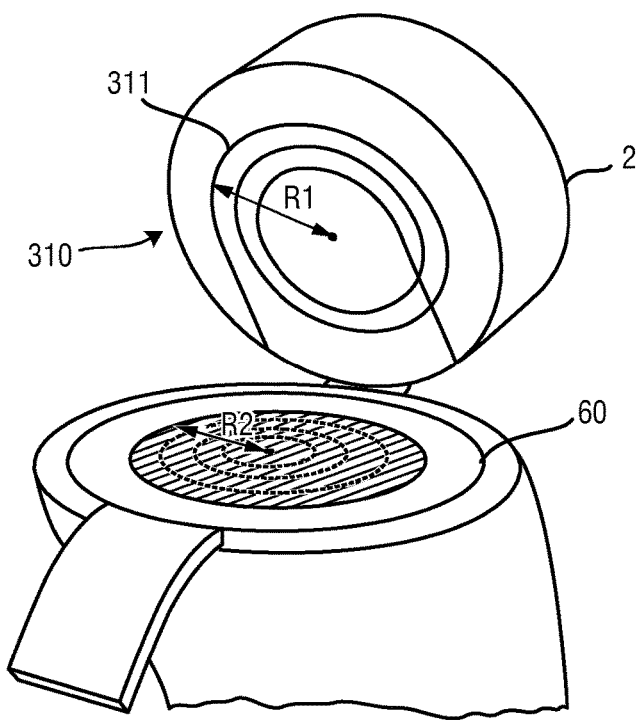

This embodiment of the consumable recognition system 310 uses only one induction coil 311 arranged in the lid 2 of the beverage dispenser. By varying the size (radius R2) of the conductive material elements 61 within the area of the induction coil 311 (having an outer radius R1), a different inductance can be generated on the single induction coil 311 for each consumable type. The conductive element 71 can also be shaped like a closed ring as shown in FIG. 4C, which creates a specific read-out, depending on the radius R2. The read-out can be translated to the type of consumable 70.

Figure 5A:
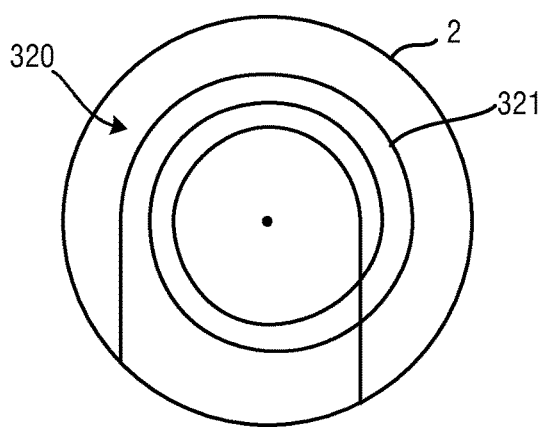
FIG. 5 shows different views of a third embodiment of a consumable recognition system and of a corresponding consumable according to the present invention.
Figure 5B:
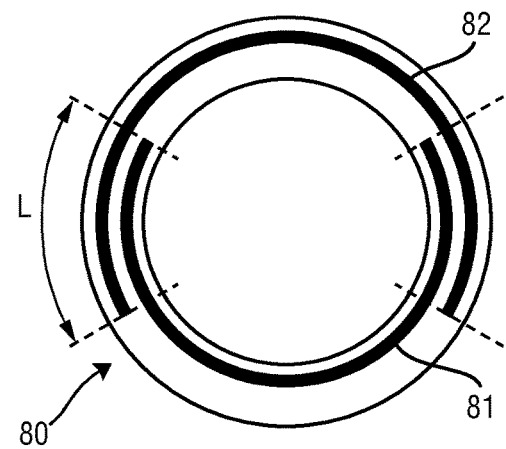
Figure 5C:
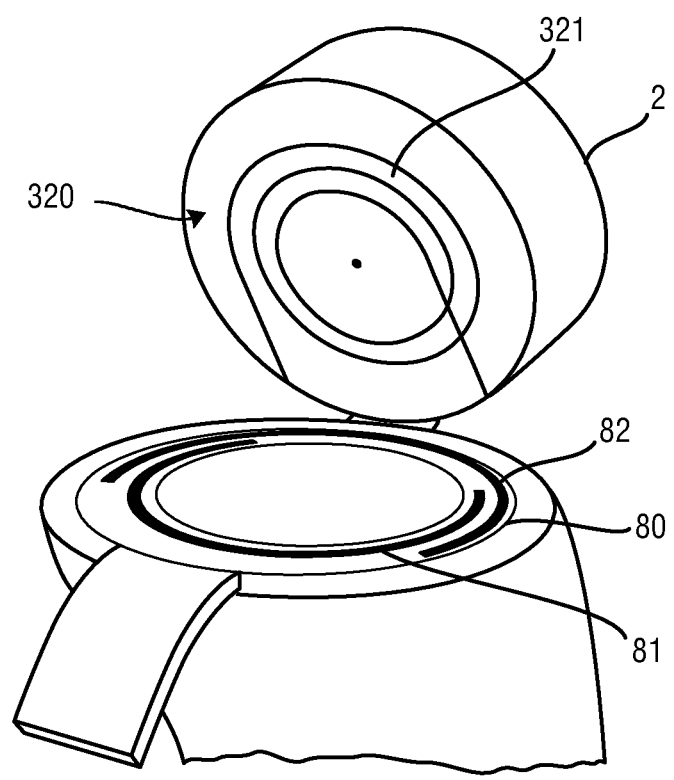

FIG. 5 shows different views of a third embodiment of a consumable recognition system 320 and of a corresponding consumable 80 according to the present invention. In particular, FIG. 5A shows a top view of the lid 2 of the beverage dispenser comprising a single induction coil 321. FIG. 5B shows a top view of the consumable 80. FIG. 5C shows a perspective view of the beverage dispenser including the consumable recognition system 320 and the consumable 80.

The consumable 80 comprises two circular metal tracks 81, 82, which creates a coil and a capacitor. These conductive tracks provide a resonance frequency, which is read by the induction coil 321 provided in the lid 2. The width w and overlap L between the two metal tracks 81, 82 determine the value of the capacitor and the coil and thus the resonance frequency of the beverage type. This particular frequency can be read by the induction coil 321.

FIG. 6 shows different views of a fourth embodiment of a consumable recognition system 330 and of a corresponding consumable 90 according to the present invention. In particular, FIG. 6A shows a top view of another embodiment of the consumable recognition system 330 comprising two concentric rings 331, 332 arranged at the lid 2 of the beverage dispenser. FIG. 6B shows a top view of the consumable 90. FIG. 6C shows a cross sectional view of the consumable recognition system 330 and the consumable 90. FIG. 6D illustrates the relationship between capacitance C, resistance R and current I. FIG. 6E shows a perspective view of the beverage dispenser including the consumable recognition system 330 and the consumable 90.

Figure 6A:
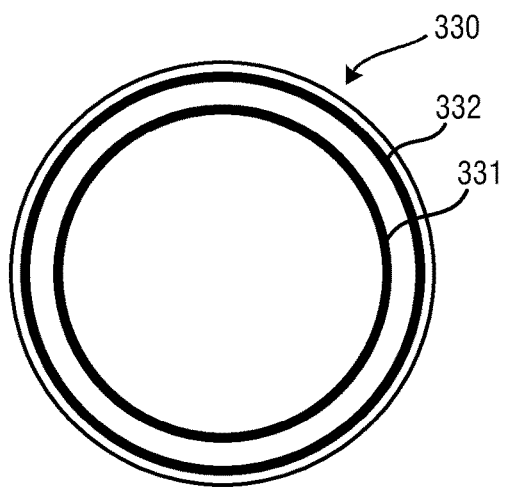
FIG. 6 shows different views of a fourth embodiment of a consumable recognition system according to the present invention and of a corresponding consumable according to the present invention.
Figure 6B:
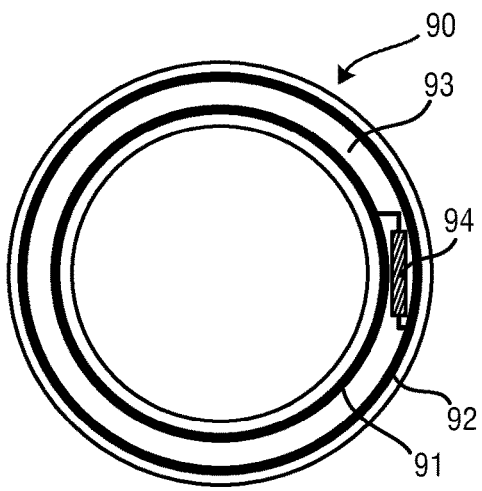
Figure 6C:
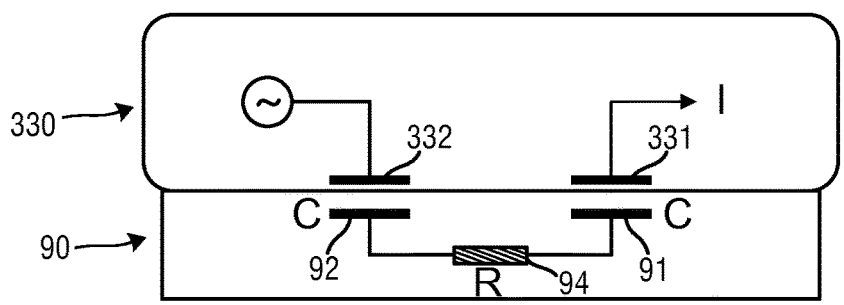
Figure 6D:
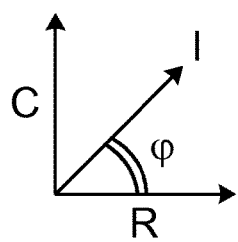
Figure 6E:
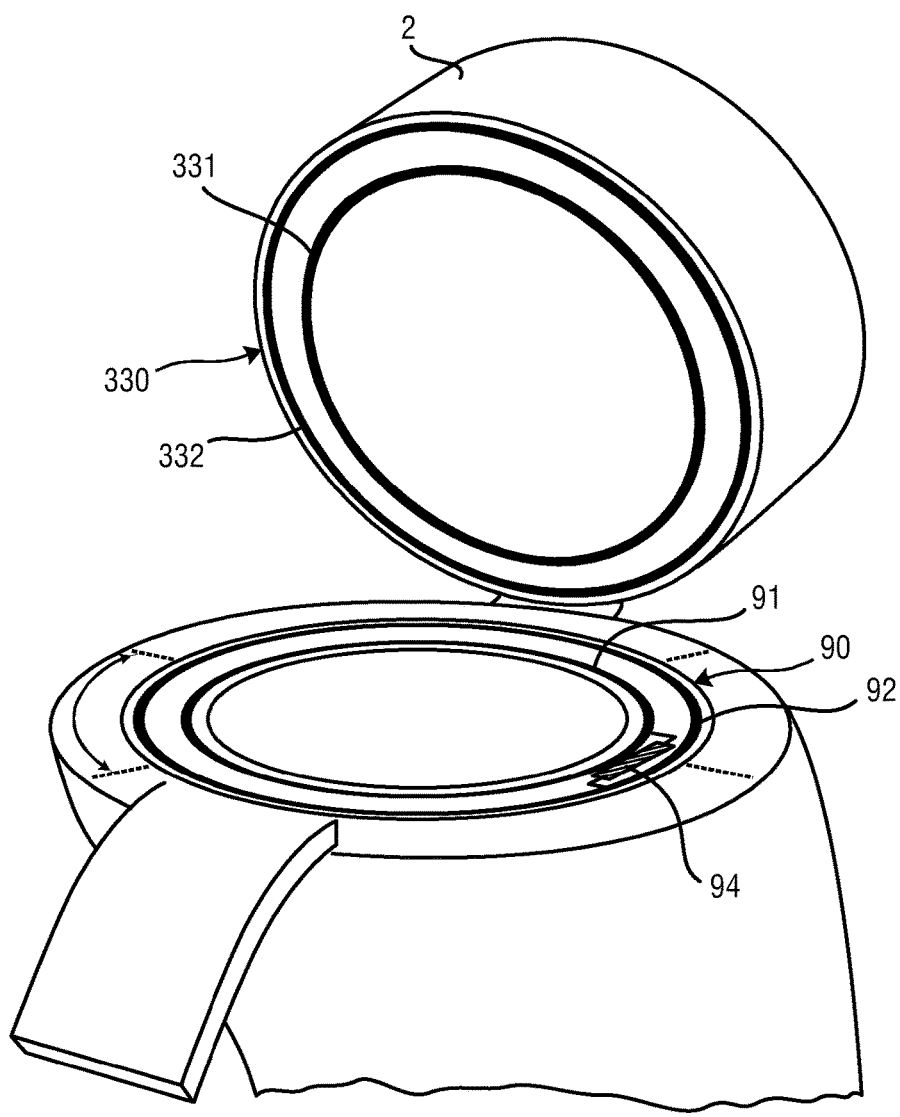
Figure 7A:
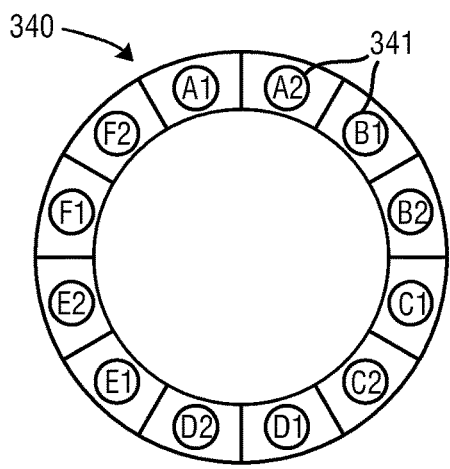
FIG. 7 shows different views of a fifth embodiment of a consumable recognition system according to the present invention and of a corresponding consumable according to the present invention.
Figure 7B:
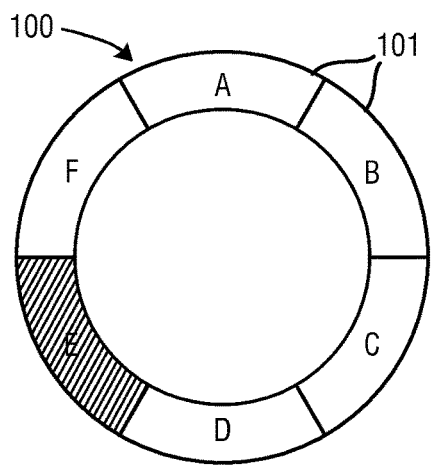
Figure 7C:
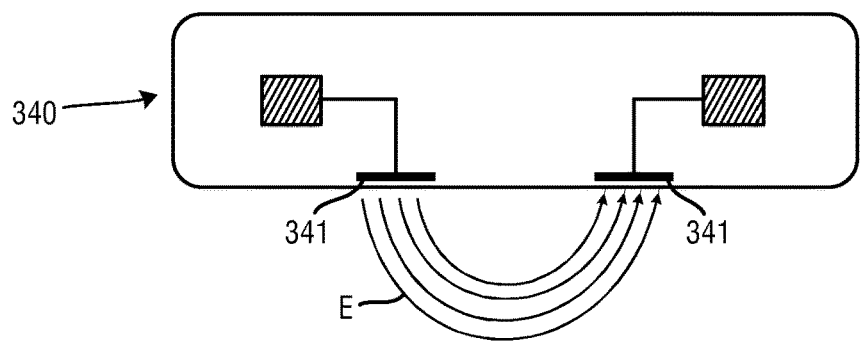
Figure 7D:
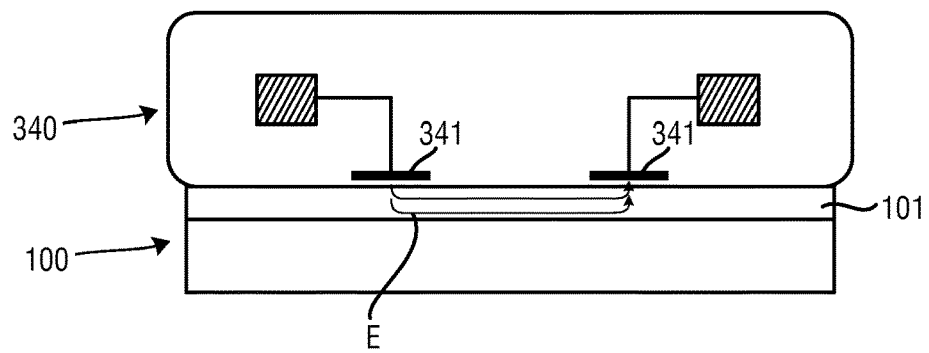

In this embodiment the consumable recognition system 330 recognizes the consumable 90 by measuring the resistor/capacitor value using capacitive coupling. On the rim 93 of the consumable 90 two centric ring-shaped contacts 91, 92 are present. The capacitance/resistance of a conducting area 94 (i.e. of a resistor having a predetermined electrical resistance) between these two rings 91, 92 is measured capacitively as illustrated in FIG. 6C. Based on the material(s) used, the thickness of the rings 91, 92 and the distance between the rings 91, 92, the measured value will be different and indicative for the type of consumable. Such a capacitive measurement has the advantage that it can be rather easily implemented (as e.g. used in touch screens and other capacitive touch products).

Thus, in this embodiment a capacitive impedance is brought up to both the rings 331, 332, and due to that a specific receptive impedance exists over the two rings 331, 332. This 'resistance' is detected as impedance and having a phase. This resistance and phase is varied e.g. by other, thicker and/or thinner material, more space between the two rings, etc.

Besides the conductive pathway the consumable may contain elements with a resistive level so that not only the capacitive level but also the resistive level is measured. The resistive level can be measured by applying an AC test and by measuring both the current level and phase. The phase information can be used to make a distinction between capacitive and resistive level.

Another option is to use an extra inductor and to measure the impedance in resonance. In resonance the inductor will cancel out the contact capacitors so that the resistor be measured directly.

In another embodiment two rings with the same diameter on top of each other are provided, but separated to make capacitive measurement possible. An indirect way to measure capacitance is to measure resonance. Normally, the inductance is fixed by the flux area and the number of windings so that the resonance changes with the square root of the capacitance.

A hydrophobic material such as parchment paper is used in an embodiment to shortly protect the electronics in the consumable from water. For instance, parts of the rim 93 of the consumable 90 may covered with a strong hydrophobic material, for instance beeswax or AF1600. After pre-wetting (i.e. an initial pressing of liquid into the consumable) of the consumable 90 these parts of the rim 93 remain dry. The $\varepsilon_R$-value of water is very high, which means that the capacitance of water covered positions is much higher compared with dry positions. So a relative small difference in water covered surface of the rim will already result in a relative large difference in measured capacitance of the whole rim. Hence, the surface part of the rim of the consumable that is covered with hydrophobic material will be indicative for the type of consumable. The hydrophobic material, as well as the conductive rings, might be applied by inkjet printing.

FIG. 7 shows different views of another embodiment of a consumable recognition system 340 and a corresponding consumable 100 according to the present invention. In particular, FIG. 7A shows a top view of the lid 2 of the beverage dispenser comprising several capacitive sensitive pads 341 (replacing the induction coils 301 shown in FIG. 3A). FIG. 7B shows a top view of the consumable 100. FIGS. 3C and 3D shows a cross section of the consumable recognition system 340 and the consumable 100 illustrating the principle of working.

In this embodiment the conducive strips 101 on the consumable 100 are not changing the magnetic path but are shorting the electric field path E created between the sensitive pads. Besides conductive pathway the consumable 100 may (also) contain elements with resistive level where besides the capacitive level also the resistive level is measured.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Consumable recognition system for recognizing placement and/or type of consumable containing a food substance for the preparation of a beverage by use of a beverage dispenser, the system comprising:
   a plurality of magnetic and/or electric field elements for separately sensing a different magnetic and/or electric field,
      wherein said consumable includes one or more magnetically and/or electrically conductive elements and the sensed magnetic and/or electric fields depend on at least one characteristic of the one or more magnetically and/or electrically conductive elements;
   a driver for providing drive currents to said magnetic and/or electric field elements; and
   a signal processor for recognizing placement and/or type of consumable based on the sensed magnetic and/or electric fields.

2. System as claimed in claim 1, wherein the sensed magnetic and/or electric fields depend on one or more of the position, orientation, material, thickness, length, width, number of the two or more magnetically and/or electrically conductive elements.

3. System as claimed in claim 1, comprising an array of induction coils and/or capacitive sensitive pads arranged above, below and/or around the consumable.

4. System as claimed in claim 1, wherein said magnetic and/or electric field elements are arranged at or within a closing member of the beverage dispenser, in particular a lid of the beverage dispenser.

5. System as claimed in claim 1, wherein the number of magnetic and/or electric field elements corresponds to the maximum number of magnetically and/or electrically conductive elements and wherein each magnetic and/or electric field element is arranged to sense a magnetic and/or electric field from a sensing area, in which at most a single magnetically and/or electrically conductive element is arranged.

6. System as claimed in claim 1, wherein said signal processor is configured to generate a code from the sensed magnetic and/or electric fields and to recognize the type of consumable based on said code.

7. System as claimed in claim 1, wherein said plurality of magnetic and/or electric field elements comprises two or more conductive pathways, in particular concentric rings of electrically conductive material for sensing an electrical field between conductive pathways.

8. Set of consumables comprising at least two consumables for use in a beverage dispenser for preparation of a beverage, each consumable of said set comprising:
   a filtering body defining a space containing a food substance, from which the beverage is obtained; and
   two or more magnetically and/or electrically conductive elements for affecting magnetic and/or electric fields sensed by one or more induction coils of a consumable recognition system,
      wherein the two or more magnetically and/or electrically conductive elements have at least one characteristic, which is affecting one or more different sensed magnetic and/or electric fields and which is different for each type of consumable of the set of consumables, and
      wherein said one or more magnetically and/or electrically conductive elements are arranged on or within a top, bottom and/or side wall of the consumable.

9. Set of consumables as claimed in claim 8, wherein the at least one characteristic of the two or more magnetically and/or electrically conductive elements is one or more of the position, orientation, material, thickness, length, width, number of the two or more magnetically and/or electrically conductive elements.

10. Set of consumables as claimed in claim 8, wherein a magnetically and/or electrically conductive element comprises a ring or a ring segment of magnetically and/or electrically conductive material.

11. Set of consumables as claimed in claim 10, wherein the rings or ring segments of the two or more magnetically and/or electrically conductive elements are arranged concentrically.

12. Beverage dispenser for preparation of a beverage by use of a consumable containing a food substance, from which the beverage is obtained by use of extraction liquid, the beverage dispenser comprising:
   a consumable recognition system as claimed in claim 1 for recognizing placement and/or type of consumable;
   a chamber for receiving the consumable and for the passage of extraction liquid through the consumable;
   a liquid processing unit for the passage of extraction liquid through the consumable; and
   a controller for controlling one or more parameters of the beverage dispenser according to the recognized placement and/or type of consumable.

13. Beverage preparation system for preparation of a beverage, the system comprising:
   a beverage dispenser as claimed in claim 12; and
   a consumable from among a set of consumables containing a food substance, from which the beverage is obtained by use of extraction liquid, said consumable being arranged in the chamber of the beverage dispenser.

* * * * *